(12) United States Patent
Stephan

(10) Patent No.: US 8,366,043 B2
(45) Date of Patent: Feb. 5, 2013

(54) STRUCTURE, ESPECIALLY A FUSELAGE STRUCTURE OF AN AIRCRAFT OR A SPACECRAFT

(75) Inventor: Andreas Stephan, Fredenbeck (DE)

(73) Assignee: Airbus Operations GmbH, Hamburg (DE)

( * ) Notice: Subject to any disclaimer, the term of this patent is extended or adjusted under 35 U.S.C. 154(b) by 260 days.

(21) Appl. No.: 12/740,880

(22) PCT Filed: Oct. 31, 2008

(86) PCT No.: PCT/EP2008/064843
§ 371 (c)(1),
(2), (4) Date: Jun. 24, 2010

(87) PCT Pub. No.: WO2009/056643
PCT Pub. Date: May 7, 2009

(65) Prior Publication Data
US 2011/0233334 A1   Sep. 29, 2011

Related U.S. Application Data

(60) Provisional application No. 60/984,038, filed on Oct. 31, 2007.

(30) Foreign Application Priority Data

Oct. 31, 2007   (DE) .......................... 10 2007 052 140

(51) Int. Cl.
*B64C 1/00* (2006.01)
(52) U.S. Cl. ....................................... 244/119; 244/120
(58) Field of Classification Search .................. 244/119, 244/117 R, 120, 123.1, 123.3, 123.4
See application file for complete search history.

(56) References Cited

U.S. PATENT DOCUMENTS

| 4,728,059 | A | * | 3/1988 | Stephen et al. | ............... | 244/119 |
| 5,062,589 | A | * | 11/1991 | Roth et al. | ................. | 244/117 R |
| 5,899,412 | A | | 5/1999 | Diiorio | | |
| 5,934,616 | A | * | 8/1999 | Reimers et al. | ............... | 244/119 |
| 6,378,805 | B1 | * | 4/2002 | Stephan et al. | ............... | 244/119 |
| 2007/0164159 | A1 | * | 7/2007 | Koch et al. | ..................... | 244/121 |
| 2007/0210211 | A1 | * | 9/2007 | Grob | ............................. | 244/119 |

FOREIGN PATENT DOCUMENTS

| DE | 38 44 080 | A1 | 7/1990 |
| DE | 3923871 | C2 | 12/1992 |
| DE | 60029963 | T2 | 8/2007 |
| EP | 0217117 | B1 | 6/1988 |
| EP | 0847916 | B1 | 10/1997 |
| EP | 1 816 070 | A | 8/2007 |

\* cited by examiner

*Primary Examiner* — Timothy D Collins
*Assistant Examiner* — Jamie S Stehle
(74) *Attorney, Agent, or Firm* — Occhiuti Rohlicek & Tsao LLP

(57) ABSTRACT

The present invention provides a fuselage structure (1; 1') of an aircraft comprising an annular skin segment (2; 2') which has a cross-sectional opening (3; 3'), a pressure cap (4; 4') for a pressure-tight closure of the cross-sectional opening (3; 3'), and a plurality of tension struts (7, 8, 9; 7', 8', 9') which in each case connect the pressure cap (4; 4') to the annular skin segment (2; 2') and absorb loads acting on the pressure cap (4; 4'), as tensile loads. This advantageously means that the tension struts (7, 8, 9; 7', 8', 9') do not have to absorb substantially any bending moments. Consequently, the tension struts can be produced with a relatively small cross section, which entails a reduction in weight. Furthermore, it is possible to produce and mount tension struts (7, 8, 9; 7', 8', 9') of this type in a simple manner.

26 Claims, 5 Drawing Sheets (B)

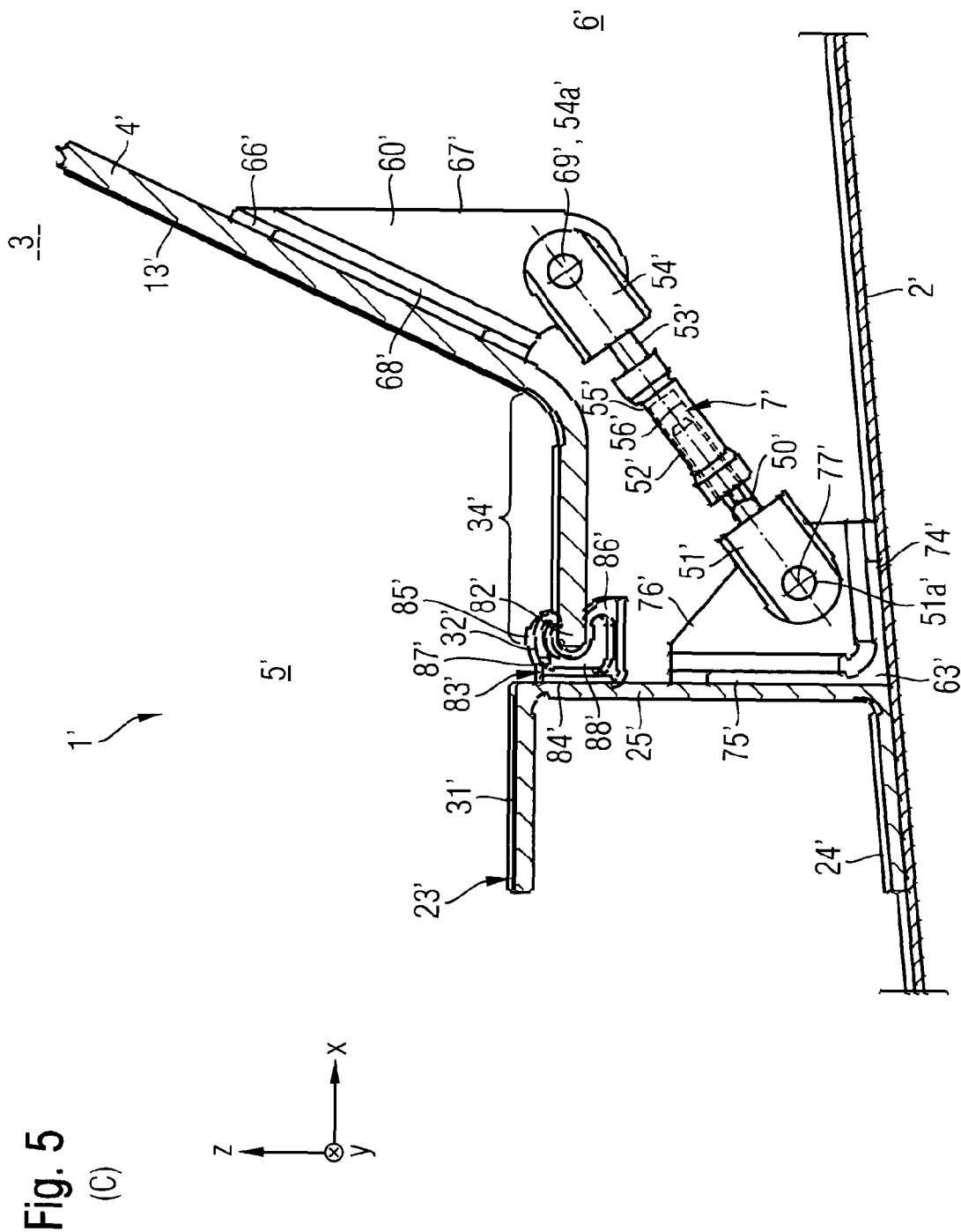

STRUCTURE, ESPECIALLY A FUSELAGE STRUCTURE OF AN AIRCRAFT OR A SPACECRAFT

CROSS-REFERENCE TO RELATED APPLICATIONS

This application is the National Stage of International Application No. PCT/EP2008/064843, filed on Oct. 31, 2008, which claims the benefit of German Application Serial No. 10 2007 052 140.7, filed on Oct. 31, 2007 and U.S. Provisional Application No. 60/984,038, filed on Oct. 31, 2007. The contents of all of the foregoing applications are hereby incorporated by reference in their entirety.

BACKGROUND OF THE INVENTION

The present invention relates to a structure, in particular to a fuselage structure of an aircraft or spacecraft.

Although the present invention and the problem on which is it based can be applied to any structures, they will be described in detail with respect to a fuselage structure of an aircraft.

During the flight phase, the cabin of an aircraft is subjected to an internal pressure which is above atmospheric pressure. For this reason, the cabin must be configured to be pressure-tight. The fuselage structure of the aircraft is therefore provided in the tail region with a pressure bulkhead. Fuselage structures of this type with pressure bulkheads are known, for example from EP 0 847 916 B1, DE 3923871 C2 or EP 0 217 117 B1.

However, it has been found that the known fuselage structures do not satisfy the more stringent requirements in the aircraft sector either in respect of assembly or in respect of weight.

SUMMARY OF THE INVENTION

It is therefore the object of the present invention to provide an improved structure which is in particular easier to assemble and/or results in a reduction in weight.

Accordingly, a structure, in particular a fuselage structure of an aircraft or spacecraft is provided. The structure has a skin portion with an opening which is closed in a pressure-tight manner by a pressure cap. Furthermore, the structure provides a plurality of tension struts which each connect the pressure cap to the skin portion and absorb loads acting on the pressure cap as tensile loads.

The idea on which the present invention is based is to introduce into the skin portion in the form of tensile loads the pressure loads which result from the pressure difference between cabin pressure and atmospheric pressure and which act on the pressure cap. The tension struts can be configured with a relatively small cross section and therefore with a low weight, as they are merely subjected to a tensile stress and are not, for example subjected to a bending stress. Furthermore, tension struts of this type can be produced very easily and can be easily connected in terms of assembly with the pressure cap or the skin portion.

Advantageous embodiments and improvements of the invention are set out in the subclaims.

According to a preferred development of the structure according to the invention, a former is provided which is connected in a pressure-tight manner to the skin portion and the pressure cap. The former preferably reinforces the skin portion in the region where the skin portion joins the tension struts. In this respect, the former absorbs from the tension struts the tension load components which act substantially vertically to the skin portion. The pressure tightness of the structure is produced by the pressure-tight connection between pressure cap, former and skin portion. The loads resulting from the pressure tightness are preferably conveyed for the most part by the tension struts from the pressure cap into the skin portion. The connection region between pressure cap, former and skin preferably has a small surface relative to the pressure cap and therefore only has to absorb pressure loads to a slight extent and accordingly can be of a simple configuration. It is therefore unnecessary to provide highly stable and complex milled parts for the connection between pressure cap, skin portion and former or for the former itself.

According to a preferred development of the structure according to the invention, a seal is provided which is arranged between the former and the pressure cap and connects them together in a pressure-tight manner. Large components such as the pressure cap are subject to relatively great tolerance variations during their production. On the other hand, relatively small components such as the seal are subject only to relatively small tolerance variations during their production. Thus it is possible to initially produce the pressure cap, during which tolerance variations are taken into account, and to then produce the seal in an exactly fitting manner so the seal ensures a tolerance compensation between the former and the pressure cap.

According to a further preferred development of the structure according to the invention, the former has an outer belt which is attached to the skin portion. The attachment can be made by, for example adhesive and/or rivets. The former advantageously has a web which extends substantially vertically from the outer belt in a radial direction to a centre axis of the skin portion or the fuselage barrel.

According to a further preferred development of the structure according to the invention, the former has an inner belt and/or a web to which the seal is attached. The web is preferably configured as described above and it connects the inner belt to the outer belt, the inner and outer belts being at a distance from one another and running substantially parallel to one another in the peripheral direction based on a centre axis of the skin portion or the fuselage barrel. It is expedient, for example to configure the former as a C-profile former. The inner and outer belts are preferably aligned parallel to an edge of the skin portion and/or to an edge of the seal or a peripheral edge of the pressure cap. The outer and/or inner belts and/or web preferably form in each case wide and easily accessible surfaces which allow a simple attachment of the skin portion and/or of the seal. The seal preferably extends in the peripheral direction based on a centre axis of the skin portion or of the fuselage barrel along the inner belt and/or along the web and is preferably bonded to one or both of them.

According to a further preferred development of the structure according to the invention, the skin portion is configured as an annular skin segment, the opening is configured as a cross-sectional opening in the annular skin segment and the former is configured as an annular former. If the structure is part of a fuselage structure of an aircraft or spacecraft, this development is particularly advantageous. The annular former advantageously prevents the annular skin segment from being constricted in the location where this is connected to the tension struts. In this respect, the annular former absorbs substantially only radial forces from the tension struts or from the skin segment. The term "annular skin segment" as used herein is understood as preferably meaning a fuselage barrel.

According to a further preferred development of the structure according to the invention, at least one support element is provided which supports the former on the skin portion. In particular if the pressure cap or the seal is attached to the inner belt or to the web on the inside of the belt, they introduce bending moments possibly resulting from the pressure difference into the former around the longitudinal axis thereof. These bending moments can simply be counteracted by the at least one support element, as otherwise the former could break in bending.

According to a preferred development of the structure according to the invention, the tension struts in each case directly connect the pressure cap to the skin portion. The term "directly" is understood as meaning that each of the tension struts has at least two attachment regions, one attachment region being attached resting against the skin portion and the other attachment region being attached resting against the pressure cap. The attachment is preferably made by rivets and/or adhesive. In this respect, the number of components can advantageously be reduced compared to an indirect connection. However, an indirect connection of this type is equally possible and affords other advantages which will be indicated in the following.

In a further preferred development of the structure according to the invention, the tension struts each have a portion on the skin side which runs between the former and the skin portion and is attached to at least the skin portion. In this respect, the portion on the skin side of a respective tension strut is aligned substantially parallel to the skin portion. This produces a substantially parallel introduction of the tensile forces into the skin portion. Since the skin portion has a very high strength or rigidity precisely in this direction, i.e. in its plane, it can accordingly be configured to be thin, as a result of which it is possible to reduce the weight.

Each of the tension struts is preferably not only connected to the skin portion but also to the formers, in particular to the outer belt. The skin-side portion of a respective tension strut, the former and the skin are preferably connected by the same attachment means, in particular rivets. This entails a further reduction in components.

According to a further preferred development of the structure according to the invention, the tension struts have a respective portion which is angled relative to the skin-side portion and which extends towards the pressure cap. The angle between the skin-side portion and the angled portion of the tension struts is for example from 100 to 170°, preferably from 120 to 150°. The pressure cap is preferably of a smaller configuration than the opening, to be closed in a pressure-tight manner, in the skin portion, in order to furthermore arrange the former and/or the seal between pressure cap and skin portion. The result of this is that the pressure cap-side portion, attached to the pressure cap, of each tension strut has to be configured running at an angle to the skin portion. To then be able to introduce the tensile loads parallel in the skin portion, the tension strut advantageously has the portion which is angled compared to the skin-side portion. Thus it is possible to achieve a structure which is optimised both in terms of space and in terms of the flow of forces.

According to a further preferred development of the structure according to the invention, the tension struts have a respective pressure cap-side portion which adjoins the angled portion and is attached to the pressure cap on the low pressure side. The phrase "on the low pressure side" is understood as meaning the side of the pressure cap which is acted on by the lower of the two pressures acting on the pressure cap on its opposing sides. In the aircraft, the low pressure side corresponds to the side on which the atmospheric pressure prevails in the flight phase. This induces the pressure cap-side portion, adjoining the angled portion, of each tension strut to engage behind the pressure cap with respect to the skin-side portion of each strut.

According to a further preferred development of the structure according to the invention, the tension strut is substantially spoon-shaped, the widening portion of the spoon shape forming the pressure cap-side portion of the tension strut. The tension strut is preferably riveted to the pressure cap in the region of the widened portion of the spoon shape. As a result of the holes to be made in the tension strut for riveting, a material weakening of the tension strut occurs which, however, can be compensated by this development.

According to a further preferred development of the structure according to the invention, the outer belt of the former is configured with a radius against which the tension strut rests in the transition region between the skin-side portion and the angled portion. This reduces the tension concentration in the transition region of the tension strut.

According to a further preferred development of the structure according to the invention, a plurality of metal fittings is respectively attached to the skin portion and/or to the former and to the pressure cap, in which case a respective tension strut connects in each case one of the skin-side and/or former-side metal fittings to in each case one of the pressure cap-side metal fittings. Each of the tension struts can preferably be connected by one end to the pressure cap-side metal fitting and by the other end to the skin-side and/or former-side metal fitting in a positive and/or non-positive manner, in particular in a detachable manner. This provides a mounting of the tension struts on the pressure cap or on the skin portion and/or on the former which is simplified compared to material-uniting connections. A simple dismounting, in particular for maintenance purposes, is also ensured.

According to a further preferred development of the structure according to the invention, the tension struts are coupled by one end to the skin-side and/or former-side metal fitting and by the other end to the pressure cap-side metal fitting in an articulated manner, in particular by an eyebolt connection. This ensures a relative mobility between the pressure cap and the former or the skin portion and a tensioning between the pressure cap and the former or the skin portion can thus be avoided. Furthermore, this promotes a uniform load of the tension struts. In addition, the tension struts can thus be mounted more easily on the respective metal fittings. Instead of using the eyebolt connection, a ball and socket connection, for example and the like can also be considered.

The tension struts are preferably of a rigid configuration. This is particularly advantageous in the case of an articulated connection thereof to the skin-side and/or former-side metal fittings or pressure cap-side metal fittings, since in this case no bending moments are introduced into the tension struts and at the same time, the pressure cap is held in position relative to the former or the skin portion by the rigid tension struts.

According to a further preferred development of the structure according to the invention, the tension struts can be adjusted in length. Thus, the tension struts can also be used to compensate tolerance variations during the assembly of the structure.

According to a further preferred development of the structure according to the invention, the seal is configured to be resilient, in particular is made of rubber. Thus, the seal can ensure a tolerance compensation between the pressure cap and the former and/or the skin portion.

According to a further preferred development of the structure according to the invention, the seal is configured as an encircling rubber tube which has a high pressure side and a low pressure side, the rubber tube being provided with at least one opening on the high pressure side and being arranged between the former and/or the skin portion as well as the pressure cap and the rubber tube presses in an intensified manner, due to the pressure difference, against the former and/or the skin portion as well as the pressure cap for a more pressure-tight closure. The term "high pressure side" is understood as meaning the side of the seal acted on by the higher of the two pressures acting on the seal on its opposing sides. The term "low pressure side" is understood as meaning the side of the seal acted on by the lower of the two pressures acting on the seal on its opposing sides. In particular, the term "low pressure side" is understood as meaning the side on which the atmospheric external pressure acts and the term "high pressure side" is understood as meaning the side on which the internal cabin pressure acts.

The struts are preferably oblong and preferably have a circular or annular cross section. Furthermore, the tension struts can be adjusted in length. The tension struts also have a respective first strut portion with a first threaded portion and a second strut portion with a second threaded portion, it being possible to change the length of each tension strut by screwing the two threaded portions into or out of one another.

The pressure cap is preferably configured as a multiply curved shell, in particular as a spherical portion. This produces a very advantageous tension distribution therein.

The pressure cap is preferably configured as a dimensionally stable component, i.e. it even retains its shape if, during operation of the aircraft or spacecraft, the cabin pressure is the same as or is even slightly below the atmospheric external pressure. The latter case can occur, for example if the auxiliary engine (APU) blows compressed air into the tip of the tail and thus onto the pressure cap as a result of damage.

The pressure cap preferably comprises a carbon fibre plastics material (CFRP). This is advantageous in view of a low weight of the structure.

The tension struts are preferably made of titanium, steel or CFRP, as they have to absorb very considerable loads. Furthermore, the tension struts can be configured flexibly such that they cannot absorb substantially any bending moments.

The seal is preferably formed from CFRP or aluminium or an aluminium alloy as this provides advantages in terms of weight.

BRIEF DESCRIPTION OF THE DRAWINGS

In the following, the invention will be described in detail based on an embodiment with reference to the accompanying figures, of which:

FIG. 5 is a view C from FIG. 4.

DETAILED DESCRIPTION

Figure 1:
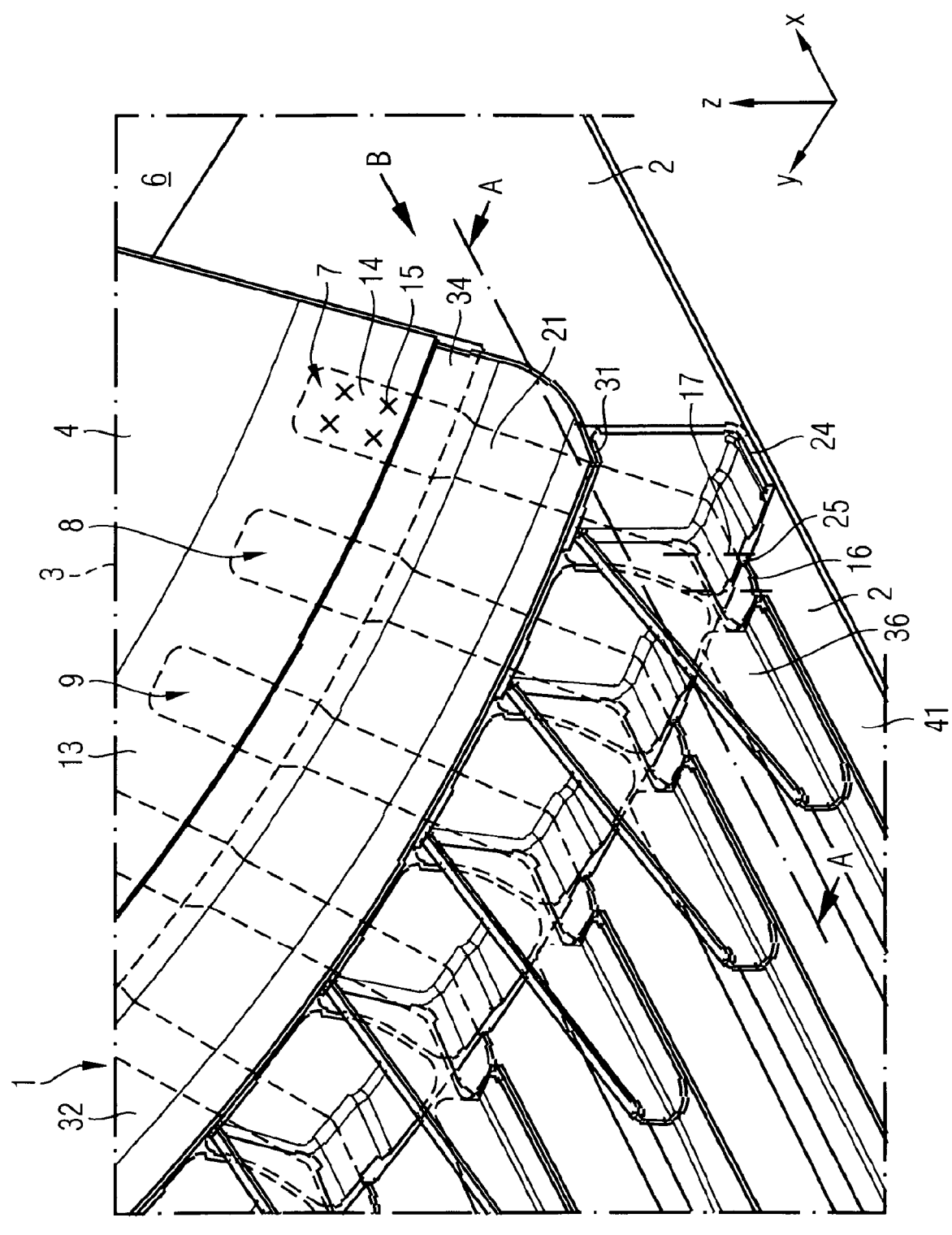
FIG. 1 is a perspective view of a structure according to an embodiment of the present invention.

In the figures, the same reference numerals denote the same or functionally identical components, unless indicated otherwise.

In the following, an embodiment of the present invention will be described in detail with reference to FIGS. 1 to 3.

The structure 1 is configured as a fuselage structure of an aircraft.

In the present case, a coordinate system with x, y and z axes is used, the (positive) x direction indicating the longitudinal direction of the aircraft, from the nose to the tail of the aircraft, the (positive) y direction indicating the transverse direction of the aircraft, in a front view of the aircraft from right to left and the (positive) z direction indicating the vertical direction of the aircraft.

The fuselage structure 1 comprises a skin portion 2 configured as an annular skin segment. The annular skin segment 2 forms the outer shell of a so-called fuselage barrel of the aircraft and is preferably formed from CFRP and/or GLARE® and/or an aluminium alloy.

The annular skin segment 2 has an opening 3 configured as a cross-sectional opening in the y-z plane. The cross-sectional opening 3 is closed in a pressure-tight manner by a pressure cap 4. The pressure cap 4 divides the aircraft fuselage into a cabin area 5 to be subjected to pressure during the flight phase and a tail area 6 which is not subjected to pressure and in which atmospheric external pressure usually prevails.

The pressure cap 4 is connected to the inside, i.e. the side facing the cabin area 5 of the annular skin segment 2 by a plurality of tension struts (for example denoted by reference numerals 7, 8, 9). The pressure cap 4 is preferably in the shape of a spherical segment, curving in the direction of the tail area 6 (i.e. in the x direction). The pressure cap 4 is preferably produced from CFRP.

The structure and function of the tension struts 7, 8, 9 will be described in the following using the example of tension strut 7.

The tension strut 7 is preferably configured in a strip shape with a rectangular cross section which is characterised by a large width to thickness ratio of the cross section, for example 20:1. This produces a comparatively high flexibility of the tension strut 7 around the y axis. The tension strut 7 is preferably formed from titanium or steel for a high stability along the longitudinal axis thereof.

The tension strut 7 has a pressure cap-side portion 14 (see also FIG. 3) by which it is connected to an annular peripheral region 13 of the pressure cap 4 on the outside thereof, i.e. on the side facing the tail area 6, preferably by rivets (for example denoted by reference numeral 15) and/or adhesive. In this respect, the tension strut 7 has an approximately spoon shape in a plan view, as can be seen in FIG. 1. The pressure cap-side end of the tension strut 7 is attached to the pressure cap 4 in the widening region 14.

The tension strut 7 is preferably connected to the skin segment 2 by rivets (for example denoted by reference numeral 17) and/or adhesive on its skin-side portion 16 opposite the pressure cap-side portion 14. The skin segment-side portion 16 of the tension strut 7 rests against the skin segment 2 in an approximately planar manner, i.e. parallel.

Joining the skin-side portion 16 of the tension strut 7 is a portion 21 which is angled compared to portion 16, of the tension strut 7 and connects the skin-side portion 16 to the pressure cap-side portion 14. The angle 22, see FIG. 2, between the skin segment-side portion 16 and the angled portion 21 is approximately 90 to 180°, preferably 110 to 150°.

The fuselage structure 1 also has a former 23 which is configured as an annular former with a preferably approximately C-shaped cross section and extends peripherally along the inside of the annular skin segment 2. The annular former 23 is configured with an outer belt 24 which is attached to the skin segment 2 preferably by the rivets 17. In this arrangement, the outer belt 24 is configured with a plurality of pockets (for example provided with reference numeral 25) through which the skin-side portion 16 of the tension strut extends.

Adjoining the outer belt 24 is a web 25 which extends radially and peripherally with respect to the annular skin segment 2 and also in an angled manner relative to the outer belt 24. Formed between the outer belt 24 and the web 25 is the annular former 23 with a radius 26 against which the tension strut 7 rests in its transition region 27 between the skin-side portion 16 and the angled portion 21. The radius 26 is preferably within a range of from 3 to 10 mm. An inner belt 31 in turn adjoins, in an angled manner, the web 25 of the annular former 23. Both the outer belt 24 and the inner belt 31 are configured substantially concentrically to the annular skin segment 2.

A seal 32 is attached in a pressure-tight manner at one end to the inner belt 31, preferably by rivets (for example provided with reference numeral 33) and/or by adhesive. At its other end, the seal 32 is attached in a pressure-tight manner preferably by rivets (for example provided with reference numeral 35) and/or adhesive, to an annular peripheral region 34 of the pressure cap 4 on the inside thereof, i.e. on the side facing the tail area 6. The peripheral region 34 is arranged at a further distance from a centre point of the pressure cap 4 than the peripheral region 13 to attach the tension strut 7. The seal is preferably formed from CFRP and/or an aluminium alloy.

Furthermore, support elements (for example provided with reference numeral 36) are provided which are configured as angles. Angle 36 extends along the longitudinal axis (x axis) of the annular skin segment 2 and radially relative thereto. Angle 36 is connected, preferably riveted at its cathetus 37 to the annular former 23 and at its cathetus 38 to a stringer 41. The stringer extends along the skin segment 2 (x axis) and is riveted and/or bonded therewith.

Figure 2:
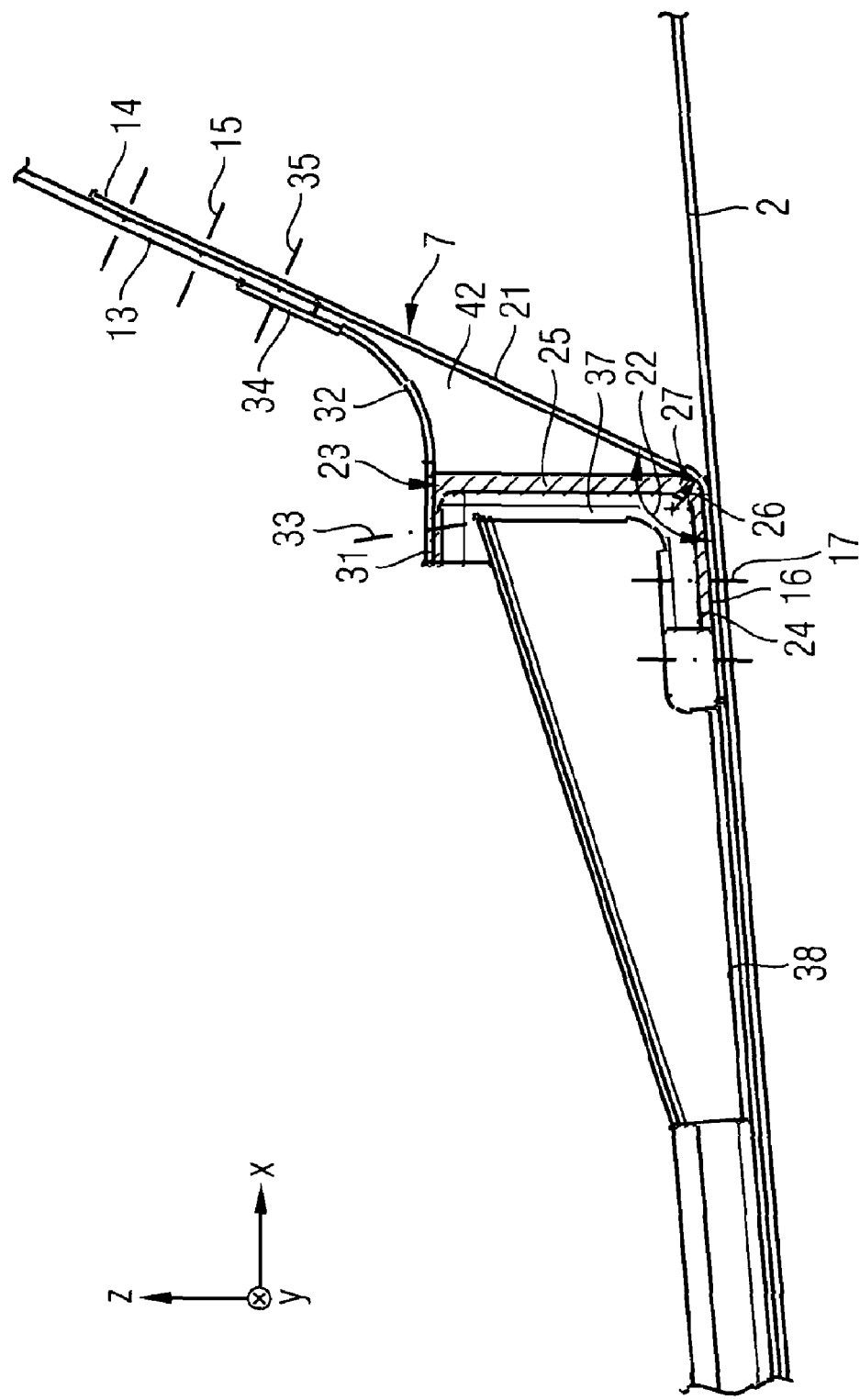
FIG. 2 is a sectional view along line A-A in FIG. 1.
Figure 3:
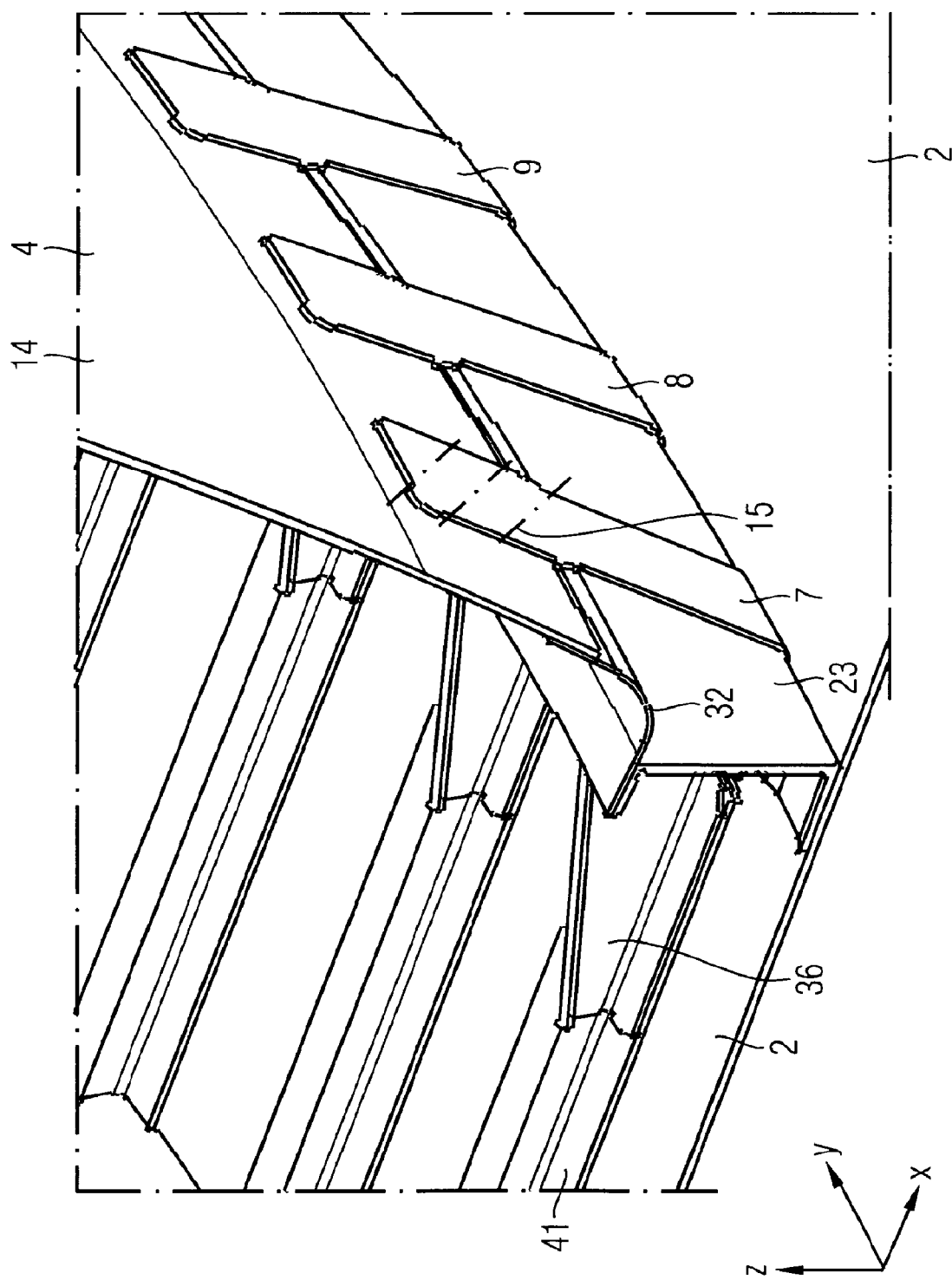
FIG. 3 is a perspective view B from FIG. 1.

Following this substantially constructive description, the mode of operation on which the structure according to FIGS. 1 to 3 is based will be briefly described below.

During the flight phase, an internal pressure prevails in the cabin area 5 which is significantly above the atmospheric external pressure in the tail area 6. The greatest part of the cross-sectional opening 3 is closed by the pressure cap 4. In this respect, intensive pressure forces act on the pressure cap 4, the resulting pressure force acting on the pressure cap 4 in the x direction. This produces tensile loads in the tension struts 7, 8, 9 which act substantially along said tension struts 7, 8, 9. The tension struts 7, 8, 9 are configured such that they can be subjected to high loads along their longitudinal axis and cannot absorb substantially any bending moments, i.e. they are configured flexibly around the y axis. Local tension concentrations in the transition region 27 are avoided in that the annular former 23 is configured with radius 26. The loads introduced into the tension strut 7 in the pressure cap-side portion 14 are introduced into the annular skin segment 2 in a substantially parallel manner, i.e. acting in the x direction, radial loads in the skin-side portion 16 of the tension strut 7 being absorbed in the annular former 23 which thus prevents a radial constriction of the annular skin segment 2. The region 42 between the pressure cap 4 and the annular former 23 is sealed by the seal 32 which is small compared to the pressure cap 4. In this respect, the seal 32 only has to absorb the relatively small pressure forces arising from the internal pressure weighing thereon. However, it does not have to absorb the great pressure forces which act on the pressure cap 4. Thus the seal 32 can be of a relatively thin-walled and simple configuration. Furthermore, the seal 32 allows a simple tolerance compensation between the pressure cap 4 and the annular former 23, since it can be of a small and simple configuration compared to the pressure cap 4 precisely due to the invention and therefore can be easily adapted to tolerance variations of the pressure cap 4 or of the annular former 23.

Figure 4:
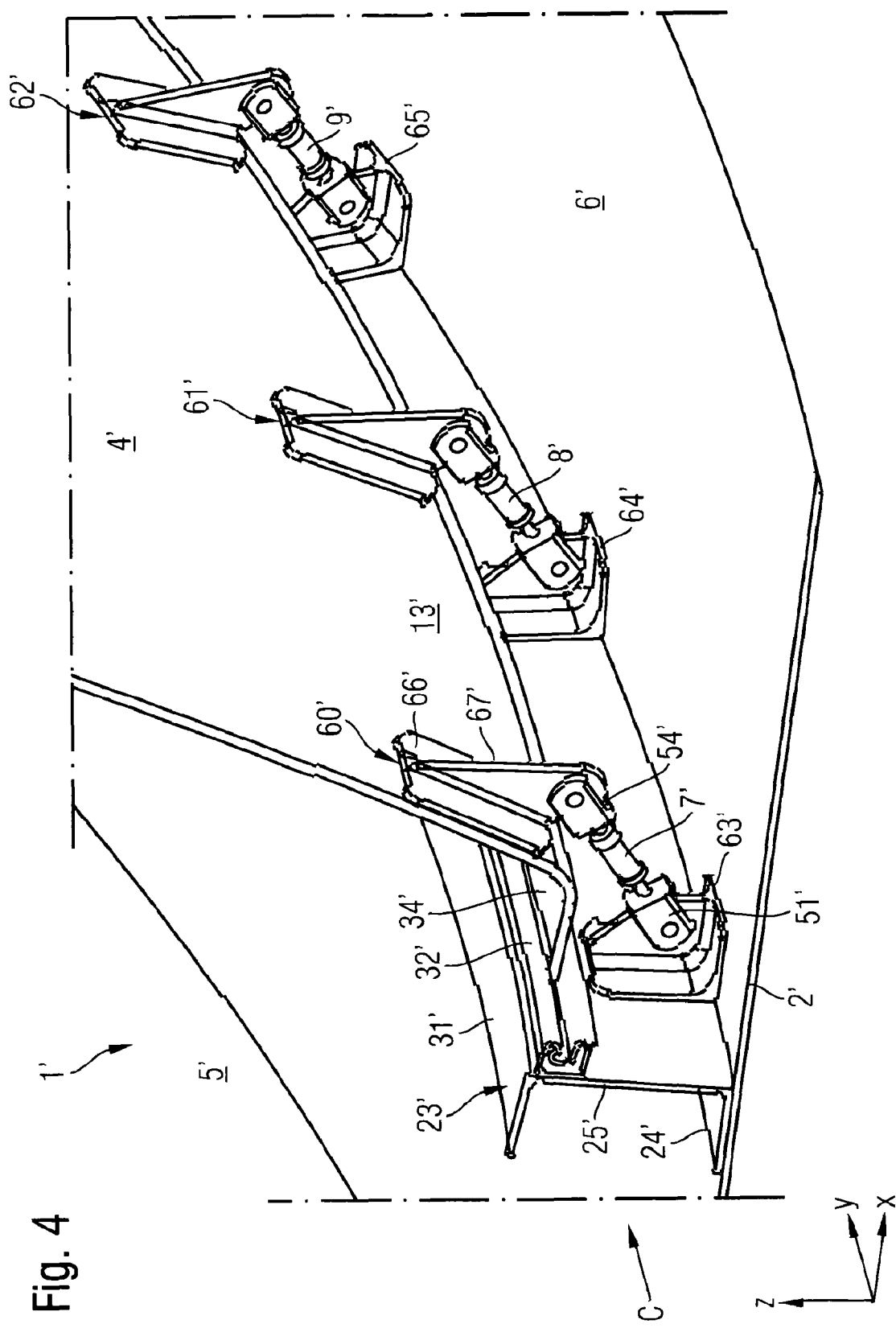
FIG. 4 is a perspective view of a structure according to a further embodiment of the present invention.

FIG. 4 is a perspective view of a structure 1' according to a further embodiment of the present invention. FIG. 5 is an enlarged view C from FIG. 4.

To distinguish between the embodiment according to FIGS. 1 to 3 and the embodiment according to FIGS. 4 and 5, the reference numerals of the latter embodiment are each characterised by "'". Numerically identical reference numerals between the embodiment according to FIGS. 1 to 3 and the embodiment according to FIGS. 4 and 5, for example 1 and 1' denote the same components or at least functionally identical components.

In the following, only the individual characteristics of the embodiment according to FIGS. 4 and 5 will be described in detail by which this embodiment differs from the embodiment according to FIGS. 1 to 3.

Each of the tension struts 7' to 9' has the construction described in the following by way of example based on the tension strut 7'.

The tension strut 7' has a first strut portion 50', see FIG. 5, which bears on one end a fork head 51' with an eye 51$a'$ and on the other end is provided with an external thread 52'. The strut 7' also has a second strut portion 53' which bears on one end a fork head 54' with an eye 54$a'$ and bears on the other end a sleeve 55'. The sleeve 55' is provided with an internal thread 56' into which the external thread 52' of the first strut portion 50' can be screwed for a positive connection between the first and second strut portions 50', 53'.

Unlike the embodiment according to FIGS. 1 to 3, in the embodiment according to FIGS. 4 and 5 first metal fittings 60', 61', 62' are attached in the peripheral region 13' of the pressure cap 4' in particular by bonding and/or riveting. Furthermore, second metal fittings 63', 64', 65' are attached to the skin portion 2' and to the web 25', in particular by bonding and/or riveting.

The first metal fittings 60', 61', 62' preferably have a respective preferably substantially rectangular plate portion 66' (described in detail in the following by way of example for metal fitting 60'), which is fitted to the peripheral portion 13' and a substantially triangular portion 67' which is attached at one of its catheti 68' to the rectangular plate portion 66' and extends substantially vertically thereto, the triangular plate portion 67' having an eye 69' opposite the cathetus 68' (substantially congruent with the eye 54$a'$ in FIG. 5). The metal fitting 60' can be connected, in particular detachably, to the tension strut 7' by a bolt which is guided through the eyes 54$a'$ and 69'.

The second metal fittings 63', 64' and 65' are preferably each configured as angles (in the following described in detail by way of example for the metal fitting 63') and have a first side plate 74' fitted to the skin portion 2' and a second side plate 75' which extends substantially at right angles to the first side plate 74' and is fitted to the web 25' of the former 23'. A substantially trapezoidal plate 76' is fitted in each case standing vertically on the first and second side plates 74', 75' and has an eye 77' approximately in the centre (substantially congruent with the eye 51$a'$ in FIG. 5). The metal fitting 63' can be connected, in particular detachably, to the tension strut 7' by a bolt which is guided through the eyes 51$a'$ and 77'.

Unlike the embodiment according to FIGS. 1 to 3, in the embodiment according to FIGS. 4 and 5 the pressure cap 4' is preferably formed with the peripheral portion 34' such that this curves substantially from the vertical (Z or Y direction) into the horizontal (X direction), see FIG. 5, and the peripheral region 34' thus forms a ring which substantially extends in the X direction and preferably has a centre axis which is identical to the centre axis of the preferably fuselage barrel-shaped skin portion 2'.

A seal 83' configured as a rubber tube is preferably provided between a former-side edge 82' of the peripheral portion 34' and the former 23'. The seal 83' is preferably approximately horseshoe-shaped and rests on one side against the web 25' and on the other side encloses the edge 82'. The seal 82' in a first portion 84' is preferably attached, in particular bonded to the web 25'. Second and third portions 85', 86' engage around the edge 82'. On its side facing the cabin area 5', the seal 83' has a plurality of holes 87' (only one is shown by way of example in FIG. 5) which fluidically connects an interior 88' of the seal 83' to the cabin area 5.

The mode of operation on which the structure according to FIGS. 4 and 5 is based will be briefly described below.

The first metal fittings 60', 61' and 62' can be mounted on the pressure cap 4' in a first mounting region. The second metal fittings 63', 64' can be mounted on the skin portion 2' or on the former 23' in a second mounting region.

Thereafter, the pressure cap 4' can be connected to the skin portion 2' or to the former 23' by the tension struts 7', 8', 9', in which case complex riveting or bonding procedures are not required. Instead, a connection can simply be produced by guiding the bolts (not shown) through the eyes 54a', 69', 51a' and 77' and then securing them against sliding out. By means of the bolts (not shown), the eyes 51a', 54a' of the tension strut 7' are then connected in a hinge-like manner to the eyes 69', 77' of the first metal fitting 60' or to the second metal fitting 63'.

Before or after the connection by the tension struts 7', 8', 9', for a compensation of tolerances which arise during the production of large components, for example the pressure cap 4' or the skin portion 2', it can be ensured that the tension struts 7', 8', 9' are shortened or lengthened by screwing the internal and external threads 52', 56' into or out of one another.

Before or after the connection by the tension struts 7', 8', 9', the seal 83' can be introduced between the pressure cap 4' and the former 23'.

In order for the seal 83' to actually allow the build-up of a differential pressure, it is provided, for example in a sealing manner on the edge 32' and the web 25'. During operation of the aircraft or spacecraft, the internal cabin pressure which is higher than the atmospheric external pressure inflates the seal 83' by means of the holes 87' in the seal 83', so that the seal 83' presses against the web 25' on one side and against the edge 82' of the pressure cap 4' on the other side, thereby achieving an improved sealing effect.

Although the invention has been described above on the basis of preferred embodiments, it is not restricted thereto, but can be modified in many different ways.

The present invention provides a fuselage structure of an aircraft comprising an annular skin segment which has a cross-sectional opening, a pressure cap for a pressure-tight closure of the cross-sectional opening and a plurality of tension struts which in each case connect the pressure cap to the annular skin segment and absorb loads acting on the pressure cap, as tensile loads. This advantageously means that the tension struts do not have to absorb substantially any bending moments. Consequently, the tension struts can be produced with a relatively small cross section, which entails a reduction in weight. Furthermore, it is possible to produce and mount tension struts of this type in a simple manner.

LIST OF REFERENCE NUMERALS

1 structure/fuselage structure
2 skin portion/annular skin segment
3 opening/cross-sectional opening
4 pressure cap
5 cabin area
6 tail area
7 tension strut
8 tension strut
9 tension strut
13 peripheral region
14 pressure-side portion
15 rivet
16 skin-side portion
17 rivet
21 angled portion
22 angle
23 former/annular former
24 outer belt
25 web
26 radius
27 transition portion
31 inner belt
32 seal
33 rivet
34 peripheral region
35 rivet
36 support element/angle
37 cathetus
38 cathetus
41 stringer
42 region
50' strut portion
51' fork head
51a' eye
52' external thread
53' strut portion
54' fork head
54a' eye
55' sleeve
56' internal thread
60' first metal fitting
61' first metal fitting
62' first metal fitting
63' second metal fitting
64' second metal fitting
65' second metal fitting
66' rectangular plate
67' triangular plate
68' cathetus
69' eye
74' side plate
75' side plate
76' trapezoidal plate
77' eye
82' edge
83' seal
84' first portion
85' second portion
86' third portion
87' hole
88' interior

The invention claimed is:

1. A structure, in particular a fuselage structure of an aircraft or spacecraft, comprising:
 a skin portion which has an opening;
 a pressure cap for a pressure-tight closure of the opening;
 a plurality of tension struts which in each case connect the pressure cap to the skin portion and absorb loads acting on the pressure cap as tensile loads;

a former which is connected in a pressure-tight manner to the skin portion and the pressure cap; and a seal which is arranged between the former and the pressure cap and connects them together in a pressure-tight manner.

2. The structure according to claim 1, wherein the former has an outer belt or a web which is attached to the skin portion.

3. The structure according to claim 1, wherein the former has at least one of an inner belt or a web to which the seal is attached.

4. The structure according to claim 1, wherein the skin portion is configured as an annular skin segment, the opening is configured as a cross-sectional opening of the annular skin segment and the former is configured as an annular former.

5. The structure according to claim 1, wherein at least one support element is provided which supports the former on the skin portion.

6. The structure according to claim 1, wherein the tension struts directly connect the pressure cap to the skin portion.

7. The structure according to claim 6, wherein the tension struts each have a skin-side portion which runs between the former and the skin portion and is attached to the skin portion or to the skin portion and the former.

8. The structure according to claim 7, wherein the tension struts each have a portion which is angled compared to the skin-side portion and extends towards the pressure cap.

9. The structure according to claim 8, wherein the tension struts each have a pressure cap-side portion which joins the angled portion and is attached to the low pressure side of the pressure cap.

10. The structure according to claim 9, wherein the tension struts are each provided with a widened portion, the widened portion forming the pressure cap-side portion of each tension strut.

11. The structure according to claim 8, wherein the outer belt of the former is configured with a radius against which the tension strut rests in the transition region between the skin-side portion and the angled portion.

12. The structure according to claim 1, wherein in each case a plurality of fittings is attached to the skin portion or to the former and also to the pressure cap, a respective tension strut connecting in each case one of the skin-side or former-side fittings to in each case one of the pressure cap-side fittings.

13. The structure according to claim 12, wherein the tension struts are coupled in an articulated manner, in particular by an eyebolt connection at one end with the skin-side or the former-side metal fitting and at the other end with the pressure cap-side metal fitting.

14. The structure according to claim 1, wherein the tension struts are configured to be rigid.

15. The structure according to claim 1, wherein the tension struts are configured to be adjustable in length.

16. The structure according to claim 15, wherein the tension struts have a respective first strut portion with a first threaded portion and a second strut portion with a second threaded portion, it being possible to adjust the length of each tension strut by screwing the two threaded portions into or out of one another.

17. The structure according to claim 1, wherein the seal is configured resiliently, in particular from rubber.

18. The structure according to claim 17, wherein the seal is configured as an encircling rubber tube which has a high pressure side and a low pressure side, the rubber tube being provided on the high pressure side with at least one opening and being arranged between the former or the skin portion and the pressure cap, the rubber tube pressing in an intensified manner against the former or the skin portion as well as against the pressure cap due to the pressure difference for a more pressure-tight closure.

19. A fuselage structure of an aircraft or spacecraft, comprising:

a skin portion having an opening;

a pressure cap for pressure-tight closure of the opening in the skin portion;

a plurality of tension struts, each of which connects the pressure cap to the skin portion and absorbs tensile loads acting on the pressure cap;

a former connected in a pressure-tight manner to the skin portion and to the pressure cap; and a seal member which is arranged between the former and the pressure cap and which interconnects them in a pressure-tight manner.

20. The structure according to claim 19, wherein the former has an inner belt or web to which the seal member is attached.

21. The structure according to claim 19, wherein the skin portion is configured as an annular skin segment, the opening is configured as a cross-sectional opening of the annular skin segment and the former is configured as an annular former.

22. The structure according to claim 19, wherein the seal member comprises a resilient material.

23. The structure according to claim 22, wherein the seal member is configured as an encircling rubber tube having a high pressure side and a low pressure side, the rubber tube being provided on the high pressure side with at least one opening and arranged between the former or the skin portion and the pressure cap.

24. The structure according to claim 19, wherein the tension struts directly connect the pressure cap to the skin portion.

25. The structure according to claim 24, wherein the tension struts each have a skin-side portion which runs between the former and the skin portion and is attached to the skin portion or to the skin portion and the former.

26. The structure according to claim 25, wherein the tension struts each have a portion which is angled compared to the skin-side portion and extends towards the pressure cap.

* * * * *